United States Patent
Asmus et al.

(10) Patent No.: US 10,705,002 B2
(45) Date of Patent: Jul. 7, 2020

(54) SENSOR FOR DETECTING ELECTRICALLY CONDUCTIVE AND/OR POLARIZABLE PARTICLES AND METHOD FOR ADJUSTING SUCH A SENSOR

(71) Applicant: HERAEUS SENSOR TECHNOLOGY GMBH, Hanau (DE)

(72) Inventors: Tim Asmus, Allendorf-Winnen (DE); Karlheinz Wienand, Aschaffenburg (DE); Stefan Dietmann, Alzenau (DE)

(73) Assignee: HERAEUS NEXENSOS GMBH, Kleinostheim (DE)

( * ) Notice: Subject to any disclaimer, the term of this patent is extended or adjusted under 35 U.S.C. 154(b) by 0 days.

(21) Appl. No.: 15/539,495

(22) PCT Filed: Dec. 7, 2015

(86) PCT No.: PCT/EP2015/078747
§ 371 (c)(1),
(2) Date: Jun. 23, 2017

(87) PCT Pub. No.: WO2016/102178
PCT Pub. Date: Jun. 30, 2016

(65) Prior Publication Data
US 2018/0328832 A1      Nov. 15, 2018

(30) Foreign Application Priority Data

Dec. 23, 2014   (DE) .................. 10 2014 119 484

(51) Int. Cl.
*G01N 15/06*      (2006.01)
*F02D 41/14*      (2006.01)
(Continued)

(52) U.S. Cl.
CPC ......... *G01N 15/0656* (2013.01); *B32B 37/18* (2013.01); *B32B 38/10* (2013.01);
(Continued)

(58) Field of Classification Search
CPC ........ G01N 15/0656; G01N 2015/0046; B32B 37/18; B32B 38/10; B32B 2457/00;
(Continued)

(56) References Cited

U.S. PATENT DOCUMENTS 4,307,061 A     12/1981 Sarholz
5,296,653 A *    3/1994 Kiyota .............. G02F 1/136286
                                                                174/250
(Continued)

FOREIGN PATENT DOCUMENTS

CN          1738061 A       2/2006
CN        101295570 A      10/2008
(Continued)

OTHER PUBLICATIONS

International Preliminary Report on Patentability issued by the International Bureau of WIPO dated Jun. 27, 2017 in application PCT/EP2015/081099.
(Continued)

*Primary Examiner* — Melissa J Koval
*Assistant Examiner* — Rahul Maini
(74) *Attorney, Agent, or Firm* — Hassan Abbas Shakir; Shakir Law PLLC

(57) ABSTRACT

A sensor for detecting electrically conductive and/or polarizable particles, in particular for detecting soot particles, includes a substrate, a first electrode layer, and a second electrode layer, which is arranged between the substrate and the first electrode layer. An insulation layer is formed betweem the first electrode layer and the second electrode layer and at least one opening is formed in the first electrode layer and in the insulation layer, wherein the opening of the first electrode layer and the opening of the insulation layer
(Continued)

are arranged one over the other at least in some segments in such a way that at least one passage to the second electrode layer is formed.

23 Claims, 3 Drawing Sheets

(51) Int. Cl.
  *F02B 1/04* (2006.01)
  *F02B 3/06* (2006.01)
  *G01N 27/07* (2006.01)
  *G01N 27/22* (2006.01)
  *F01N 11/00* (2006.01)
  *B32B 37/18* (2006.01)
  *B32B 38/10* (2006.01)
  *F01N 13/00* (2010.01)
  *G01N 27/04* (2006.01)
  *G01N 15/00* (2006.01)
  *F02D 41/22* (2006.01)

(52) U.S. Cl.
  CPC .......... *F01N 11/007* (2013.01); *F01N 13/008* (2013.01); *F02B 1/04* (2013.01); *F02B 3/06* (2013.01); *F02D 41/1466* (2013.01); *F02D 41/1494* (2013.01); *G01N 27/043* (2013.01); *G01N 27/07* (2013.01); *G01N 27/226* (2013.01); *B32B 2457/00* (2013.01); *F01N 2560/05* (2013.01); *F01N 2560/20* (2013.01); *F02D 41/222* (2013.01); *G01N 2015/0046* (2013.01)

(58) Field of Classification Search
  CPC .. F01N 11/007; F01N 13/008; F01N 2560/05; F01N 2560/20; F02B 1/04; F02B 3/06; F02D 41/1466; F02D 41/1494; F02D 41/222
  USPC ....................................................... 324/693
  See application file for complete search history.

(56) References Cited

U.S. PATENT DOCUMENTS

| | | | |
|---|---|---|---|
| 6,471,838 B1 | 10/2002 | Igel et al. | |
| 6,572,748 B1* | 6/2003 | Herrmann | G01N 27/301 |
| | | | 204/408 |
| 6,811,663 B1 | 11/2004 | Freeman | |
| 7,638,035 B2 | 12/2009 | Sasaki et al. | |
| 2002/0090649 A1 | 7/2002 | Chan et al. | |
| 2007/0117243 A1 | 5/2007 | Sharma | |
| 2007/0119233 A1 | 5/2007 | Schnell et al. | |
| 2008/0047847 A1 | 2/2008 | Schmidt et al. | |
| 2008/0268638 A1 | 10/2008 | Dertinger et al. | |
| 2009/0056416 A1* | 3/2009 | Nair | G01N 15/0656 |
| | | | 73/28.01 |
| 2009/0134026 A1 | 5/2009 | Langenbacher | |
| 2010/0000863 A1 | 1/2010 | Kondo et al. | |
| 2010/0116682 A1 | 5/2010 | Neuzil et al. | |
| 2010/0141278 A1 | 6/2010 | Yamaguchi et al. | |
| 2010/0231908 A1 | 9/2010 | Nakano | |
| 2011/0216317 A1 | 9/2011 | Marra | |
| 2012/0085146 A1* | 4/2012 | Maeda | G01N 27/043 |
| | | | 73/23.31 |
| 2012/0211362 A1* | 8/2012 | Onkawa | G01N 27/4077 |
| | | | 204/424 |
| 2012/0324981 A1 | 12/2012 | Hedayat et al. | |

FOREIGN PATENT DOCUMENTS

| | | |
|---|---|---|
| CN | 101295702 A | 10/2008 |
| CN | 101517403 A | 8/2009 |
| CN | 102680552 A | 9/2012 |
| CN | 103698367 A | 4/2014 |
| DE | 2836002 A1 | 2/1980 |
| DE | 3726479 C2 | 4/1996 |
| DE | 10244702 A1 | 5/2003 |
| DE | 10353860 A1 | 6/2005 |
| DE | 102004043121 A1 | 3/2006 |
| DE | 102004043122 A1 | 3/2006 |
| DE | 69925727 T2 | 6/2006 |
| DE | 102005016395 A1 | 10/2006 |
| DE | 102005029219 A1 | 12/2006 |
| DE | 102006042605 A1 | 3/2008 |
| DE | 102007047078 A1 | 4/2009 |
| DE | 102008041808 A1 | 3/2010 |
| EP | 1030174 A2 | 8/2000 |
| FR | 3010524 A1 | 3/2015 |
| JP | 2000241343 A | 9/2000 |
| JP | 2003517149 A | 5/2003 |
| JP | 2003262144 A | 9/2003 |
| JP | 2006515066 A | 5/2006 |
| JP | 2007017432 A | 1/2007 |
| JP | 2008512661 A | 4/2008 |
| JP | 2009085959 A | 4/2009 |
| JP | 2010503856 A | 2/2010 |
| JP | 2012078130 A | 4/2012 |
| JP | 2012168193 A | 9/2012 |
| JP | 2012220257 A | 11/2012 |
| TW | 200730814 A | 8/2007 |
| TW | 201022657 A | 6/2010 |
| TW | 201425923 A | 7/2014 |
| WO | 9960392 A | 11/1999 |
| WO | 0143870 A2 | 6/2001 |
| WO | 0239039 A1 | 5/2002 |
| WO | 2005050174 A1 | 6/2005 |
| WO | 2006027287 A1 | 3/2006 |
| WO | 2008033419 A2 | 3/2008 |
| WO | 2008117853 A1 | 10/2008 |

OTHER PUBLICATIONS

Translation of of the Written Opinion in application PCT/EP2015/081099 dated Jun. 27, 2017 with International Preliminary Report on Patentability issued by the International Bureau of WIPO dated Jun. 27, 2017 in application PCT/EP2015/081099.
International Preliminary Report on Patentability issued by the International Bureau of WIPO dated Jun. 27, 2017 in application PCT/EP2015/081100.
Translation of of the Written Opinion in application PCT/EP2015/081100 dated Jun. 27, 2017 with International Preliminary Report on Patentability issued by the International Bureau of WIPO dated Jun. 27, 2017 in application PCT/EP2015/08110.
International Preliminary Report on Patentability issued by the International Bureau of WIPO dated Jun. 27, 2017 in application PCT/EP2015/078747.
Translation of of the Written Opinion in application PCT/EP2015/078747 dated Jun. 27, 2017 with International Preliminary Report on Patentability issued by the International Bureau of WIPO dated Jun. 27, 2017 in application PCT/EP2015/078747.
Office Action issued by the German Patent Office dated Aug. 26, 2015 in application DE 10 2014 119 484.5, partial machine translation provided.
International Search Report issued by European Patent Office dated Mar. 18, 2016 in application PCT/EP2015/078747, translation provided.
Search Report dated Dec. 7, 2016 by Taiwan Intellectual Property Office in Taiwanese patent application No. 104143135, partial translation provided.
Written Opinion issued by European Patent Office in application PCT/EP2015/078747, in German.
Office Action issued by the German Patent Office dated Feb. 20, 2017 in application DE 10 2015 122 673.1, partial machine translation provided.
International Search Report issued by European Patent Office dated Mar. 22, 2016 in application PCT/EP2015/081099, translation provided.

(56) References Cited

OTHER PUBLICATIONS

Written Opinion issued by European Patent Office in application PCT/EP2015/081099, in German.
Search Report dated Apr. 17, 2017 by Taiwan Intellectual Property Office in Taiwanese patent application No. 104143417, partial translation provided.
Office Action issued by the German Patent Office dated Feb. 27, 2017 in application DE 10 2015 122 668.5, partial machine translation provided.
International Search Report issued by European Patent Office dated Mar. 14, 2016 in application PCT/EP2015/08110, translation provided.
Written Opinion issued by European Patent Office in application PCT/EP2015/081100, in German.
English language Translation of Office Action dated Apr. 24, 2018 by the Japanese Patent Office in related Japanese Patent Application 2017-534260.
Office Action dated Jul. 31, 2017 by the Taiwanese Patent Office in related Taiwanese Patent Application No. 104143413, partial machine translation provided; (reference TW 201629459 a is not cited since the reference's priority application is the priority application of the present application).
Office Action in U.S. Appl. No. 15/539,522 issued by the United States Patent & Trademark Office dated Mar. 1, 2019.
Office Action in U.S. Appl. No. 15/539,534 issued by the United States Patent & Trademark Office dated Mar. 1, 2019.
Examination Report in Chinese Patent Application 201580076847.0 issued by the State Intellectual Property Office of the People's Republic of China dated Jun. 3, 2019, translation provided.
Examination Report in Chinese Patent Application 2015800768305 issued by the State Intellectual Property Office of the People's Republic of China dated Jun. 11, 2019, translation provided.
Office Action in Korean Patent Application 10-2017-7020622 issued by the Korean Intellectual Property Office of the People's Republic of China dated Jun. 5, 2019, translation provided.
Office Action in U.S. Appl. No. 15/539,522 issued by the US Patent & Trademark Office dated Jul. 5, 2019.
Office Action in U.S. Appl. No. 15/539,534 issued by the US Patent & Trademark Office dated Jul. 8, 2019.
Examination Report in Chinese Patent Application 2015800768305 issued by the State Intellectual Property Office of the People's Republic of China dated Feb. 3, 2020; translation provided.

* cited by examiner

SENSOR FOR DETECTING ELECTRICALLY CONDUCTIVE AND/OR POLARIZABLE PARTICLES AND METHOD FOR ADJUSTING SUCH A SENSOR

BACKGROUND OF THE INVENTION

1. Field of the Invention

The invention is directed to a sensor for detecting electrically conductive and/or polarizable particles, in particular for detecting soot particles. The invention is also directed to a method for producing a sensor for detecting electrically conductive and/or polarizable particles.

2. Discussion of the Related Art

The prior art discloses sensors comprising a sensor carrier, with electrodes and heating structures being arranged on this sensor carrier in a planar arrangement. In a detecting mode of operation, polarizable and/or electrically conductive particles are deposited on this planar arrangement. The deposited particles bring about a reduction in the resistance between the electrodes, this drop in the resistance being used as a measure of the mass of deposited particles. When a predefined threshold value with respect to the resistance is reached, the sensor arrangement is heated by the heating structures, so that the deposited particles are burned and, after the cleaning process, the sensor can be used for a further detection cycle.

DE 10 2005 029 219 A1 gives a description of a sensor for detecting particles in an exhaust-gas flow of internal combustion engines, the electrode, heater and temperature-sensor structures having been applied to a sensor carrier in a planar arrangement. One disadvantage of this sensor arrangement is that the electrodes to be bridged have a necessary minimum length in order to be able to arrive at an acceptable sensitivity range when measuring conductive or polarizable particles, such as for example soot. However, a certain size of the sensor component is necessary for this, in order to be able to arrange the minimum length for the electrodes to be bridged. This is accompanied by corresponding cost disadvantages in the production of these sensor components.

The invention is based on the object of providing a further-developed sensor for detecting electrically conductive and/or polarizable particles, in particular for detecting soot particles, the sensor being minimized with regard to its size, so that the aforementioned disadvantages can be overcome.

The object of the present invention is also to provide a method for producing a sensor of this type.

SUMMARY OF THE INVENTION

This object is achieved according to the invention by a sensor for detecting electrically conductive and/or polarizable particles, in particular for detecting soot particles and a method.

The invention is based on the idea of providing a sensor for detecting electrically conductive and/or polarizable particles, in particular for detecting soot particles, comprising a substrate, a first electrode layer and a second electrode layer arranged between the substrate and the first electrode layer, an insulation layer being formed between the first electrode layer and the second electrode layer and at least one opening being respectively formed in the first electrode layer and in the insulation layer, the opening in the first electrode layer and the opening in the insulation layer being arranged at least in certain portions one over the other in such a way that at least one passage to the second electrode layer is formed.

In other words, a sensor is made available, a first and a second electrode layer being arranged horizontally one over the other and an insulation layer being formed between the two electrode layers. In order to form a passage to the second electrode layer, so that particles to be detected, in particular soot particles, can reach the second electrode layer with the aid of the passage, both the first electrode layer and the insulation layer respectively have at least one opening, the opening in the first electrode layer and the opening in the insulation layer being arranged at least in certain portions one over the other, so that the passage is formed or can be formed.

Particles can accordingly reach the second electrode layer by way of at least one passage only from one side of the sensor, to be specific from the side of the sensor that is made to be the closest to the first electrode layer. The electrically conductive and/or polarizable particles accordingly lie on a portion of the second electrode layer.

Preferably, the opening in the first electrode layer is formed at a distance from the peripheral region of the first electrode layer and the opening in the insulation layer is formed at a distance from the peripheral region of the insulation layer. The openings are accordingly preferably not formed in a peripheral position, or not formed at the side peripheries of the layers concerned.

The first electrode layer and the second electrode layer are insulated from one another by the insulation layer located in between. Such a structure allows a very sensitive sensor of a smaller overall size in comparison with sensors of the prior art to be formed.

The second electrode layer, preferably formed with a flat extent, is indirectly or directly connected to the substrate. An indirect connection of the second electrode layer to the substrate may take place for example by means of a bonding agent layer. A bonding agent layer may be formed between the second electrode layer and the substrate. The bonding agent layer may for example consist of an aluminum oxide ($Al_2O_3$) or a silicon dioxide ($SiO_2$). The bonding agent layer is preferably formed very thin, and consequently only has a small thickness.

The insulation layer may have a thickness of 0.5 μm, in particular of 1.0 μm to 40 μm, in particular of 5.0 μm to 30 μm, in particular of 7.5 μm to 20 μm, in particular of 8 μm to 12 μm. With the aid of the thickness of the insulation layer, the distance of the first electrode layer from the second electrode layer is set. The sensitivity of the sensor can be increased by reducing the distance between the flat-extending, electrode layers, located one over the other. The smaller the thickness of the insulation layer is formed, the more sensitive the sensor is made.

The insulation layer may be formed from aluminum oxide ($Al_2O_3$) or silicon dioxide ($SiO_2$) or magnesium oxide (MgO) or silicon nitride ($Si_3N_4$) or glass.

Preferably, the insulation layer laterally encloses the second electrode layer. In other words, the insulation layer can cover the side faces of the second electrode layer in such a way that the second electrode layer is laterally insulated.

The first electrode layer and/or the second electrode layer is formed from metal or an alloy, in particular from a high-temperature-resistant metal or a high-temperature-resistant alloy, particularly preferably from a platinum metal or from an alloy of a platinum metal. The elements of the platinum metals are palladium (Pd), platinum (Pt), rhodium (Rh), osmium (Os), iridium (Ir) and ruthenium (Rh). Nonprecious metals with nickel (Ni) or nonprecious metal alloys with nickel/chromium or nickel/iron may also be used. These metals or alloys of these metals are particularly high-temperature-resistant and are accordingly suitable for the forming of a sensor element that can be used for detecting soot particles in an exhaust-gas flow of internal combustion engines.

In a further embodiment of the invention, the second electrode layer is formed from a metal or an alloy, that has a higher etching resistance than the metal or the alloy of the first electrode layer. This has the advantage that the second electrode layer can be formed in a production process as a layer stopping the etching process. In other words, a second electrode layer formed in this way can determine the depth to be etched of a passage that is for example to be introduced into the sensor structure.

On the side of the first electrode layer that is facing away from the insulation layer there may be formed a covering layer, which is formed in particular from ceramic and/or glass and/or metal oxide. In other words, the covering layer is formed on a side of the electrode layer that is opposite from the insulation layer. The covering layer may serve as a diffusion barrier and additionally reduces an evaporation of the first electrode layer at high temperatures, which in an exhaust-gas flow for example may be up to 850° C.

The covering layer may laterally enclose the first electrode layer. In a further embodiment of the invention, the covering layer may additionally laterally enclose the insulation layer. In other words, both the side faces of the first electrode layer and the side faces of the insulation layer arranged thereunder may be covered by the covering layer. It is also conceivable that the covering layer additionally laterally encloses the second electrode layer. The lateral enclosing part or lateral enclosing region of the covering layer may accordingly reach from the first electrode layer to the second electrode layer. This brings about a lateral insulation of the first electrode layer and/or of the insulation layer and/or of the second electrode layer.

On the side of the first electrode layer that is facing away from the insulation layer or on the side of the covering layer that is facing away from the first electrode layer there may be additionally formed a porous filter layer. With the aid of a porous filter layer of this type, large particle parts can be kept away from the arrangement of two electrode layers arranged one over the other. The porosity of the filter layer may be for example>1 µm. Particularly preferably, the porosity is formed in a range from 20 µm to 30 µm. The porous filter layer may for example be formed from a ceramic material. It is also conceivable that the porous filter layer is formed from an aluminum oxide foam. With the aid of the filter layer, which also covers the at least one passage to the second electrode layer, the large particles, in particular soot particles, that disturb the measurement can be kept away from the at least one passage, so that such particles cannot cause a short circuit.

The at least one passage to the second electrode layer may for example be formed as a blind hole, a portion of the second electrode layer being formed as the bottom of the blind hole and the blind hole extending at least over the insulation layer and over the first electrode layer. If the sensor has a covering layer, the blind hole also extends over this covering layer. In other words, not only the first electrode layer but also the insulation layer and the covering layer then have an opening, these openings being arranged one over the other in such a way that they form a blind hole, the bottom of which is formed by a portion of the second electrode layer. The bottom of the blind hole may for example be formed on the upper side of the second electrode layer that is facing the insulation layer. It is also conceivable that the second electrode layer has a depression that forms the bottom of the blind hole.

The opening cross section of the blind hole is formed by the peripheral portions of the first electrode layer and of the insulation layer and, if there is one, of the covering layer that bound the openings. The opening cross section of the at least one blind hole may be round or square or rectangular or lenticular or honeycomb-shaped or polygonal. Other types of design are also conceivable.

For example, it is possible that the blind hole has a square cross section with a surface area of $3\times 3$ µm² to $150\times 150$ µm², in particular of $10\times 10$ µm² to $100\times 100$ µm², in particular of $15\times 15$ µm² to $50\times 50$ µm², in particular of $20\times 20$ µm².

In a development of the invention, the sensor may have a multiplicity of blind holes, these blind holes being formed as already described. It is also conceivable that at least two blind holes have different cross sections, so that a sensor array with a number of zones can be formed, in which a number of measuring cells with blind-hole cross sections of different sizes can be used. Parallel detection of electrically conductive and/or polarizable particles, in particular of soot particles, allows additional items of information concerning the size of the particles or the size distribution of the particles to be obtained.

In a further embodiment of the invention, the first electrode layer and the insulation layer are respectively formed as porous, the at least one opening in the first electrode layer and the at least one opening in the insulation layer respectively being formed by at least one pore, the pore in the insulation layer and the pore in the first electrode layer being arranged at least in certain portions one over the other in such a way that the at least one passage to the second electrode layer is formed. In other words, it is possible to dispense with an active or subsequent structuring of the passages, the first electrode layer and the insulation layer being formed as permeable to the medium to be measured.

This can be made possible for example by a porous or granular structure of the two layers. Both the first electrode layer and the insulation layer can be produced by sintering together individual particles, with pores or voids for the medium to be measured being formed while they are being sintered together. Accordingly, at least one passage that allows access to the second electrode layer for a particle that is to be measured or detected must be formed, extending from the side of the first electrode layer that is facing away from the insulation layer to the side of the second electrode layer that is facing the insulation layer as a result of the one-over-the-other arrangement of pores in the first electrode layer and in the insulation layer. If the sensor has a covering layer, this covering layer is also to be formed as porous in such a way that a pore in the covering layer, a pore in the first electrode layer and a pore in the insulation layer form a passage to the second electrode layer.

The particle size distribution in the first electrode layer and/or the insulation layer and/or the covering layer can be optimized with regard to the measuring or detecting tasks to be carried out.

The first electrode layer and/or the insulation layer and, if there is one, the covering layer may have portions with different porosities in such a way that a sensor array with a number of zones of different porosities is formed. Parallel detection with portions of layers of different porosities allows a "fingerprint" of the medium that is to be analyzed or detected to be measured. Accordingly, further items of information concerning the size of the particles to be measured or the size distribution of the particles to be measured can be obtained.

The first electrode layer and the second electrode layer respectively have an electrical contacting area that are free from sensor layers arranged over the respective electrode layers and are or can in each case be connected to a terminal pad. The two electrode layers are connected or can be connected to terminal pads in such a way that they are insulated from one another. For each electrode layer there is formed at least one electrical contacting area, which is exposed in the region of the terminal pads for the electrical contacting. The electrical contacting area of the first electrode layer is free from a possible covering layer and free from a passive porous filter layer. In other words, above the electrical contacting area of the first electrode layer there is neither a portion of the covering layer nor a portion of the filter layer.

The electrical contacting area of the second electrode layer is free from the insulation layer, the first electrode layer, and also free from a possibly formed covering layer and free from a passive porous filter layer. In other words, on the electrical contacting area of the second electrode layer there is neither a portion of the insulation layer nor a portion of the first electrode layer, a portion of the insulation layer or a portion of the passive porous filter layer.

In a further embodiment of the invention, the first electrode layer and/or the second electrode layer has strip conductor loops in such a way that the first electrode layer and/or the second electrode layer is formed as a heating coil and/or as a temperature-sensitive layer and/or as a shielding electrode. The first electrode layer and/or the second electrode layer has at least one additional electrical contacting area that is free from sensor layers arranged over the electrode layer, that is to say the first and/or the second electrode layer, and is connected or can be connected to an additional terminal pad. In other words, the first electrode layer and/or the second electrode layer has two electrical contacting areas, both electrical contacting areas being free from sensor layers arranged over the electrode layer.

The formation of two electrical contacting areas on an electrode layer is necessary whenever this electrode layer is formed as a heating coil and/or temperature-sensitive layer and/or as a shielding electrode. Preferably, the second electrode layer has at least two electrical contacting areas. The second electrode layer is preferably formed not only as a heating coil but also as a temperature-sensitive layer and as a shielding electrode. By appropriate electrical contacting of the electrical contacting area, the electrode layer can either heat or act as a temperature-sensitive layer or shielding electrode. Such a formation of the electrode areas allows compact sensors to be provided, since one electrode layer can assume a number of functions. Accordingly, no separate heating coil layers and/or temperature-sensitive layers and/or shielding electrode layers are necessary.

To sum up, it can be stated that a very accurately measuring sensor can be made available as a result of the structure according to the invention made much smaller than known sensors. Furthermore, significantly more units can be formed on a substrate or a wafer during the production of the sensor. This structure is consequently accompanied by a considerable cost advantage in comparison with normally planar-constructed structures.

According to an independent aspect, the invention relates to a method for producing a sensor for detecting electrically conductive and/or polarizable particles, in particular a method for producing a described sensor according to the invention.

The method comprises that a laminate with a first electrode layer, a second electrode layer and an insulation layer, which is arranged between the first electrode layer and the second electrode layer, is produced, at least one passage that extends over the first electrode layer and the insulation layer being subsequently introduced into the laminate, the bottom of the passage being formed by a portion of the second electrode layer. The method is also based on the idea of producing a laminate which comprises at least a first electrode layer, a second electrode layer and an insulation layer, in order to introduce at least one passage into this laminate. The passage serves as access to the second electrode layer for the particles to be detected, in particular soot particles.

The production of the laminate and/or of the individual layers of the laminate may take place by a thin-film technique or a thick-film technique or a combination of these techniques. As part of a thin-film technique to be applied, a vapor depositing process or preferably a cathode sputtering process may be chosen. As part of a thick-film process, a screen-printing process is conceivable in particular. The insulation layer and/or a covering layer, which is formed on the side of the first electrode layer that is facing away from the insulation layer, may be formed by a chemical vapor deposition (CVD process) or a plasma-enhanced chemical vapor deposition (PECVD process).

The insulation layer may be produced in such a way that it laterally encloses the second electrode layer. An optionally present covering layer may likewise be produced in such a way that it laterally encloses the first electrode layer and/or the insulation layer a and/or the second electrode layer. Accordingly, both the insulation layer and the covering layer may form an additional lateral enclosure.

The passage may for example be formed as a blind hole, the at least one blind hole or a subportion of the blind hole being introduced into the laminate by at least one etching process, in particular by a plasma-ion etching process, or by a number of successively carried out etching processes which is adapted to the layer of the laminate that is respectively to be etched. In other words, a blind hole may be introduced into the laminate in such a way that, for example for each layer to be penetrated or to be etched, an etching process that is optimum for this layer is used, and consequently a number of etching steps that are to be successively carried out are carried out.

It is also conceivable that the blind hole or a subportion of the blind hole may be made in a chemical etching process from the liquid or vapor phase. The first electrode layer preferably consists of a metal, in particular a platinum layer, which is relatively easy to etch through or to etch.

In one possible embodiment of the method according to the invention it is possible that the etching process stops at the second electrode layer if the second electrode layer is produced from a material that is more resistant to etching in comparison with the first electrode layer and with the insulation layer. If the laminate or the sensor comprises an additional covering layer, the second electrode layer also comprises a material that is more resistant to etching in comparison with this covering layer. For example, the second electrode layer is produced from a platinum-titanium alloy (Pt/Ti). It is also conceivable that the second electrode layer consists of a layer filled with metal oxides.

In a further embodiment of the method according to the invention it is possible that the insulation layer is formed as a layer stopping the etching process and, in a further step, a subportion of the blind hole is introduced into the insulation layer by a conditioning process or a conditioning step with phase conversion of the insulation layer.

In a further embodiment of the method according to the invention it is possible that the at least one passage and/or a passage is formed as a blind hole and this blind hole or the at least one blind hole or a subportion of the blind hole is introduced into the laminate by a laser machining process, the laser source and/or the wavelength and/or the pulse frequency of the laser being adapted to the layer of the laminate that is respectively to be machined. One further possibility for producing the passage that is formed as a blind hole is consequently the partial removal of the laminate by means of a laser. Laser sources with different wavelengths and/or pulse frequencies that are respectively made to suit the material to be removed can be used. Such a procedure has the advantage that, by making them suit the material of the layer that is to be removed, the respectively individual laser machining steps can be carried out quickly, so that overall an improved introduction of passages and/or blind holes into the laminate is obtained. The use of an ultrashort pulse laser proves to be particularly advantageous.

In a further embodiment of the method according to the invention it is possible that, when producing the laminate, the insulation layer is created over the full surface area, in particular by a screen-printing process or spraying-on process or immersion process or spin-coating process, between the first electrode area and the second electrode area and, in a subsequent method step, at least a portion of the insulation layer is removed, in particular by structured dissolving or etching or burning out, in such a way that the passage extending over the first electrode layer and the insulation layer is formed. Such a method corresponds to the lost mold principle. Accordingly, it is possible, especially in the case of thermally stable materials, to perform structuring by the lost mold principle. A lost mold serves for creating a passage from the first electrode layer to the second electrode layer. The insulation layer or insulating layer is created between the first electrode layer and the second electrode layer from a thermally stable material, a portion of this insulation layer preferably being removed by dissolving or etching or burning out after the application of the first electrode layer. As a result of this, the first electrode layer located thereover is also removed. If a covering layer is formed, the portion of the covering layer that is located over the removed portion of the insulation layer is also removed by the dissolving or etching or burning out of the portion of the insulation layer.

Preferably, after the introduction of a passage and/or a blind hole into the laminate, a passive porous filter layer is applied on the covering layer. The passive porous filter layer is formed for example by an aluminum oxide foam. This is also formed over the at least one passage or over the at least one blind hole.

In a further independent aspect, the invention relates to a method that serves for producing a sensor for detecting electrically conductive particles and/or polarizable particles, in particular a sensor. A laminate with a first electrode layer, a second electrode layer and an insulation layer, which is arranged between the first electrode layer and the second electrode layer, is produced, the insulation layer and the first electrode layer being formed as porous layers. The porosities of the first electrode layer and the insulation layer are set in such a way that at least one pore in the first electrode layer and at least one pore in the insulation layer are arranged at least in certain portions one over the other, so that at least one passage to the second electrode layer is produced.

If the sensor has a covering layer, this covering layer is also applied to the first electrode layer with a porosity, at least one pore in the covering layer being arranged at least in certain portions over a pore in the first electrode layer and a pore in the insulation layer in such a way that, starting from the covering layer, at least one passage to the second electrode layer is formed. A passive porous filter layer may finally be applied to the covering layer.

In a further independent aspect, a method for producing a sensor for detecting electrically conductive particles, in particular for producing a sensor, is provided, a laminate with a first electrode layer, a second electrode layer and an insulation layer, which is arranged between the first electrode layer and the second electrode layer, being produced, the insulation layer and the first electrode layer being structured, in particular created by a lift-off process and/or an ink-jet process and/or in a stamping process, in such a way that, as a result of the structured application of the individual layers one over the other, a passage to the second electrode layer is formed.

In other words, already during the production of the insulation layer and/or the first electrode layer, such a structure that has openings or clearances is produced, a number of openings that are arranged at least in certain portions one over the other forming at least one passage to the second electrode layer. If the sensor has a covering layer, this covering layer may also be applied in an already structured form to the first electrode layer.

In the case of all of the described processes for producing a sensor for detecting electrically conductive and/or polarizable particles, it is necessary that an electrical contacting area is respectively formed in the first electrode layer and in the second electrode layer. This is achieved by portions of the first electrode layer and of the second electrode layer being kept free from sensor layers arranged over the respective electrode layers. This may take place on the one hand by the electrical contacting areas being produced by removing and/or etching away and/or lasering away sensor layers arranged thereover. It is also conceivable that the insulation layer and/or the first electrode layer and/or the covering layer are applied to one another in a structured form, so that the electrical contacting areas are already kept free during the production of the individual sensor layers.

In a further embodiment of the invention it is conceivable that, when producing the laminate, the electrical contacting areas are covered with the aid of stencils, so that the electrical contacting areas cannot be coated with other sensor layers.

BRIEF DESCRIPTION OF THE DRAWINGS

The invention is explained in more detail below on the basis of exemplary embodiments with reference to the accompanying schematic drawings, in which.

DETAILED DESCRIPTION OF THE INVENTION

Figure 1A:
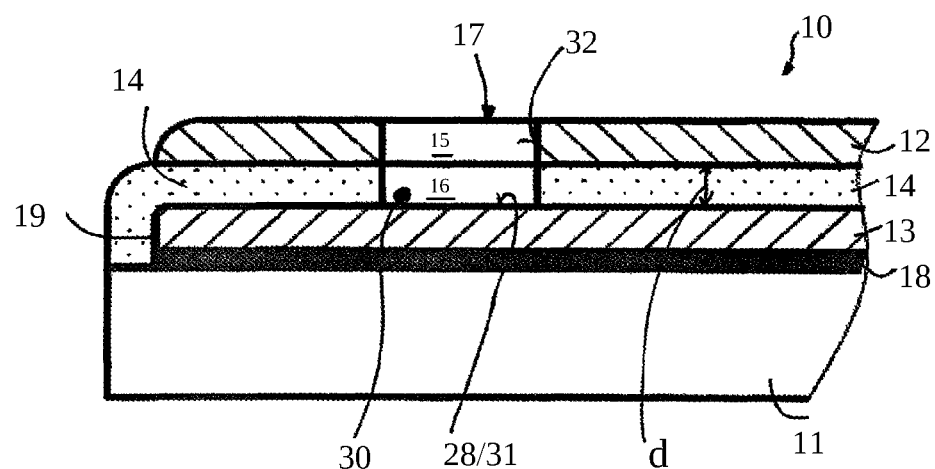
FIGS. 1a-c show sectional representations of various embodiments of sensors for detecting electrically conductive and/or polarizable particles.

The same reference numerals are used below for parts that are the same and parts that act in the same way.

FIG. 1a shows in a sectional representation a sensor 10 for detecting electrically conductive and/or polarizable particles, in particular for detecting soot particles. The sensor 10 comprises a substrate 11, a first electrode layer 12 and a second electrode layer 13, which is arranged between the substrate 11 and the first electrode layer 12. An insulation layer 14 is formed between the first electrode layer 12 and the second electrode layer 13. At least one opening is respectively formed in the first electrode layer 12 and in the insulation layer 14, the opening 15 in the first electrode layer 12 and the opening 16 in the insulation layer 14 being arranged one over the other, so that a passage 17 to the second electrode layer 13 is formed.

For the purposes of a high-temperature application, the substrate 11 is formed for example from aluminum oxide ($Al_2O_3$) or magnesium oxide (MgO) or from a titanate or from steatite.

The second electrode layer 13 is connected to the substrate 11 indirectly by way of a bonding agent layer 18. The bonding agent layer 18 may be for example very thinly formed aluminum oxide ($Al_2O_3$) or silicon dioxide ($SiO_2$).

In the exemplary embodiment, the first electrode layer 12 is formed by a platinum layer. In the example shown, the second electrode layer 13 consists of a platinum-titanium alloy (Pt—Ti). The platinum-titanium alloy of the second electrode layer 13 is a layer that is more resistant to etching in comparison with the first electrode layer 12.

The distance between the first electrode layer 12 and the second electrode layer 13 is formed by the thickness d of the insulation layer 14. The thickness d of the insulation layer may be 0.5 µm to 50 µm. In the present case, the thickness d of the insulation layer is 10 µm. The sensitivity of the sensor 10 according to the invention can be increased by reducing the distance between the first electrode layer 12 and the second electrode layer 13, and consequently by reducing the thickness d of the insulation layer 14.

The insulation layer 14 covers the second electrode layer 13 on the side face 19 shown, so that the second electrode layer 13 is laterally enclosed and insulated.

The passage 17 is formed as a blind hole, a portion of the second electrode layer 13 being formed as the bottom 28 of the blind hole. The blind hole or the passage 17 extends over the insulation layer 14 and over the first electrode layer 13. The passage 17 is in other words formed by the openings 15 and 16 arranged one over the other. In the embodiment shown, the openings 15 and 16 are not formed peripherally.

A soot particle 30 can enter the passage 17. In FIG. 1a, the particle 30 is lying on the bottom 28 of the blind hole, and consequently on a side 31 of the second electrode layer 13. However, the particle 30 is not touching the first electrode layer 12 in the peripheral region 32, which bounds the opening 15. As a result of the particle 30 being deposited on the bottom 28 and touching the second electrode layer 13 on the side 31, the electrical resistance is reduced. This drop in the resistance is used as a measure of the accumulated mass of particles. When a predefined threshold value with respect to the resistance is reached, the sensor 10 is heated, so that the deposited particle 30 is burned and, after being burned free, the sensor 10 can detect electrically conductive and/or polarizable particles in a next detection cycle.

Figure 1B:
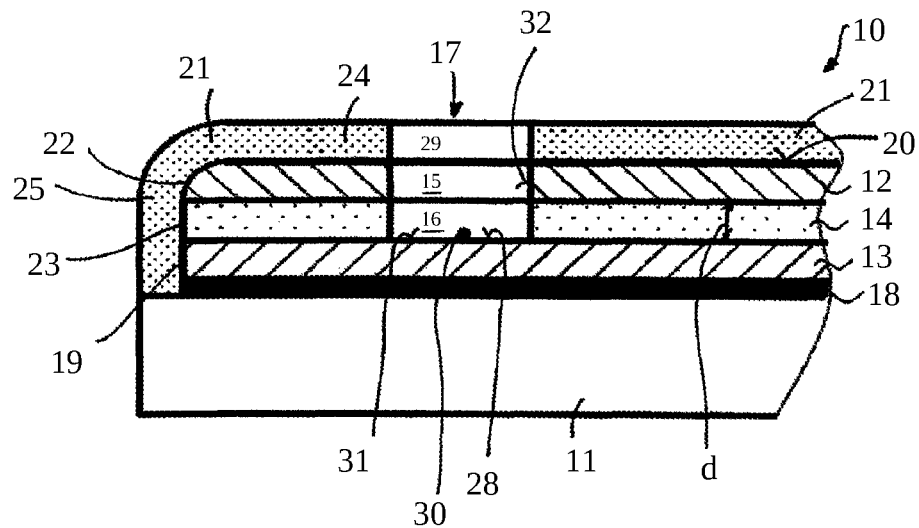

FIG. 1b likewise shows in a sectional representation a sensor 10 for detecting electrically conductive and/or polarizable particles, in particular for detecting soot particles. Likewise shown are a first electrode layer 12 and a second electrode layer 13, which is arranged between the substrate 11 and the first electrode layer 12. An insulation layer 14 is formed between the first electrode layer 12 and the second electrode layer 13. With respect to the properties and the design of the openings 15 and 16, reference is made to the explanations in connection with the embodiment according to FIG. 1a.

A covering layer 21, which is for example formed from ceramic and/or glass and/or metal oxide, is formed on the side 20 of the first electrode layer 12 that is facing away from the insulation layer 14. The covering layer 21 encloses the side face 22 of the first electrode layer 12, the side face 23 of the insulation layer 14 and the side face 19 of the second electrode layer 13. The covering layer 21 consequently covers the side faces 19, 22 and 23, so that the first electrode layer 12, the second electrode layer 13 and the insulation layer 14 are laterally insulated. The covering layer 21 consequently comprises an upper portion 24, which is formed on the side 20 of the first electrode layer 12, and a side portion 25, which serves for the lateral insulation of the sensor 10.

Figure 1C:
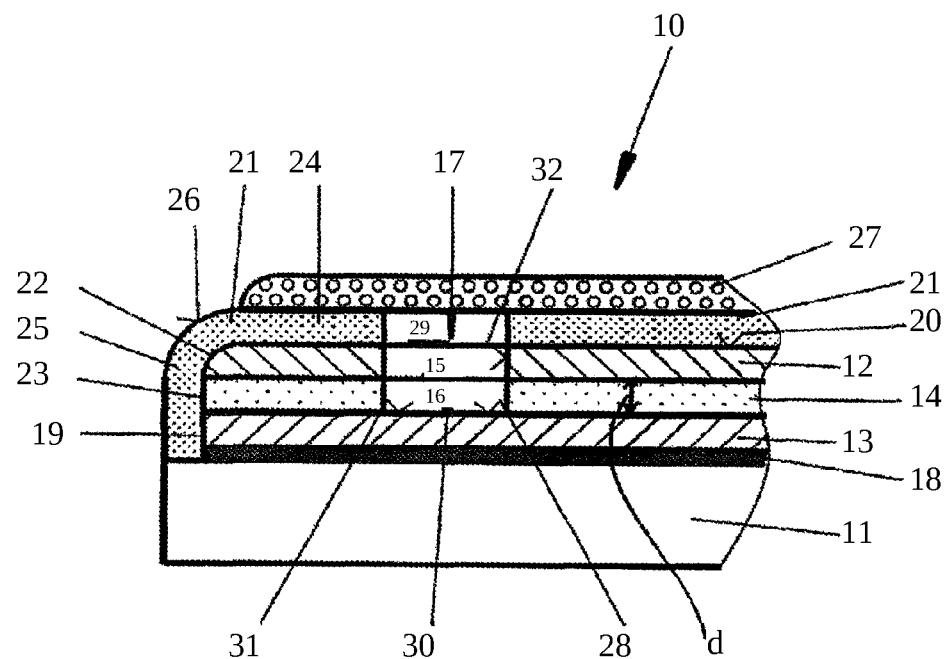

FIG. 1c shows in a sectional representation a sensor 10 for detecting electrically conductive and/or polarizable particles, in particular for detecting soot particles. The sensor 10 comprises a substrate 11, a first electrode layer 12 and a second electrode layer 13, which is arranged between the substrate 11 and the first electrode layer 12. An insulation layer 14 is formed between the first electrode layer 12 and the second electrode layer 13. At least one opening is respectively formed in the first electrode layer 12 and in the insulation layer 14, the opening 15 in the first electrode layer 12 and the opening 16 in the insulation layer 14 being arranged one over the other, so that a passage 17 to the second electrode layer 13 is formed.

For the purposes of a high-temperature application, the substrate 11 is formed for example from aluminum oxide ($Al_2O_3$) or magnesium oxide (MgO) or from a titanate or from steatite.

The second electrode layer 13 is connected to the substrate 11 indirectly by way of a bonding agent layer 18. The bonding agent layer 18 may be for example very thinly formed aluminum oxide ($Al_2O_3$) or silicon dioxide ($SiO_2$).

In the exemplary embodiment, the first electrode layer 12 is formed by a platinum layer. In the example shown, the second electrode layer 13 consists of a platinum-titanium alloy (Pt—Ti). The platinum-titanium alloy of the second electrode layer 13 is a layer that is more resistant to etching in comparison with the first electrode layer 12.

The insulation layer 14 consists of a thermally stable material with a high insulation resistance. For example, the insulation layer 14 may be formed from aluminum oxide ($Al_2O_3$) or silicon dioxide ($SiO_2$) or magnesium oxide (MgO) or silicon nitride ($Si_3N_4$) or glass.

The distance between the first electrode layer 12 and the second electrode layer 13 is formed by the thickness d of the insulation layer 14. The thickness d of the insulation layer may be 0.5 µm to 50 µm. In the present case, the thickness d of the insulation layer is 10 µm. The sensitivity of the sensor 10 according to the invention can be increased by reducing the distance between the first electrode layer 12 and the second electrode layer 13, and consequently by reducing the thickness d of the insulation layer 14.

A covering layer 21, which is for example formed from ceramic and/or glass and/or metal oxide, is formed on the side 20 of the first electrode layer 12 that is facing away from the insulation layer 14. The covering layer 21 encloses the side face 22 of the first electrode layer 12, the side face 23 of the insulation layer 14 and the side face 19 of the second electrode layer 13. The covering layer 21 consequently covers the side faces 19, 22 and 23, so that the first electrode layer 12, the second electrode layer 13 and the insulation layer 14 are laterally insulated. The covering layer 21 consequently comprises an upper portion 24, which is formed on the side 20 of the first electrode layer 12, and a side portion 25, which serves for the lateral insulation of the sensor 10.

In a further embodiment of the invention it is conceivable that the covering layer 21 also laterally encloses the substrate 11.

A porous filter layer 27 is formed on the side 26 of the covering layer 21 that is facing away from the first electrode layer 12. The sensitivity of the sensor 10 is increased as a result of the formation of this passive porous filter or protective layer 27 which is facing the medium that is to be detected with regard to electrically conductive and/or polarizable particles, since larger particles or constituents that could disturb the measurement or detection are kept away from the first electrode layer 12 and the second electrode layer 13. Since the passage 17 is covered by the porous filter layer 27, particles can still penetrate through the pores in the porous filter layer 27, but short-circuits caused by large penetrated particles can be avoided as a result of the porous filter layer 27.

The passage 17 is formed as a blind hole, a portion of the second electrode layer 13 being formed as the bottom 28 of the blind hole. The blind hole or the passage 17 extends over the insulation layer 14, the first electrode layer 13 and over the covering layer 21. For this purpose, the covering layer 21 also has an opening 29. In other words, the passage 17 is formed by the openings 29, 15 and 16 arranged one over the other.

As a result of the choice of materials for the individual layers and the insulation of the individual layers from one another, the sensor 10 shown is suitable for a high-temperature application of up to for example 850° C. The sensor 10 can accordingly be used as a soot particle sensor in the exhaust-gas flow of an internal combustion engine.

After penetrating through the porous filter layer 27, a soot particle 30 can enter the passage 17. In FIG. 1c, the particle 30 lies on the bottom 28 of the blind hole, and consequently on a side 31 of the second electrode layer 13. However, the particle is not touching the first electrode layer 12 in the peripheral region 32, which bounds the opening 15. As a result of the particle 30 being deposited on the bottom 28 and touching the second electrode layer 13 on the side 31, the electrical resistance is reduced. This drop in the resistance is used as a measure of the accumulated mass of particles. When a predefined threshold value with respect to the resistance is reached, the sensor 10 is heated, so that the deposited particle 30 is burned and, after being burned free, the sensor 10 can detect electrically conductive and/or polarizable particles in a next detection cycle.

Figure 2:
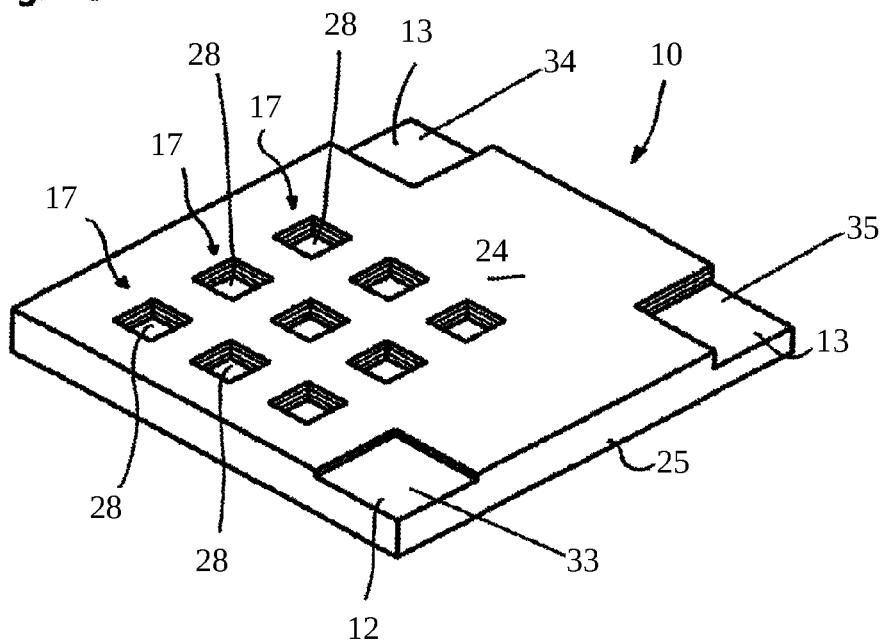
FIG. 2 shows a perspective plan view of a sensor according to the invention.

FIG. 2 shows a perspective view of a sensor 10. The sensor has nine passages 17. For better illustration, the porous filter layer 27 is not shown in FIG. 2. The upper portion 24 of the covering layer 21 and also the side portion 25 of the covering layer 21 can be seen. The bottoms 28 of the passages 17 are formed by portions of the second electrode layer 13. The nine passages 17 have a square cross section, it being possible for the square cross section to have a surface area of 15×15 $\mu m^2$ to 50×50 $\mu m^2$.

The first electrode layer 12 has an electrical contacting area 33. The second electrode layer 13 likewise has an electrical contacting area 34. The two electrical contacting areas 33 and 34 are free from sensor layers arranged over the respective electrode layers 12 and 13. The electrical contacting areas 33 and 34 are or can in each case be connected to a terminal pad (not shown).

Figure 3:
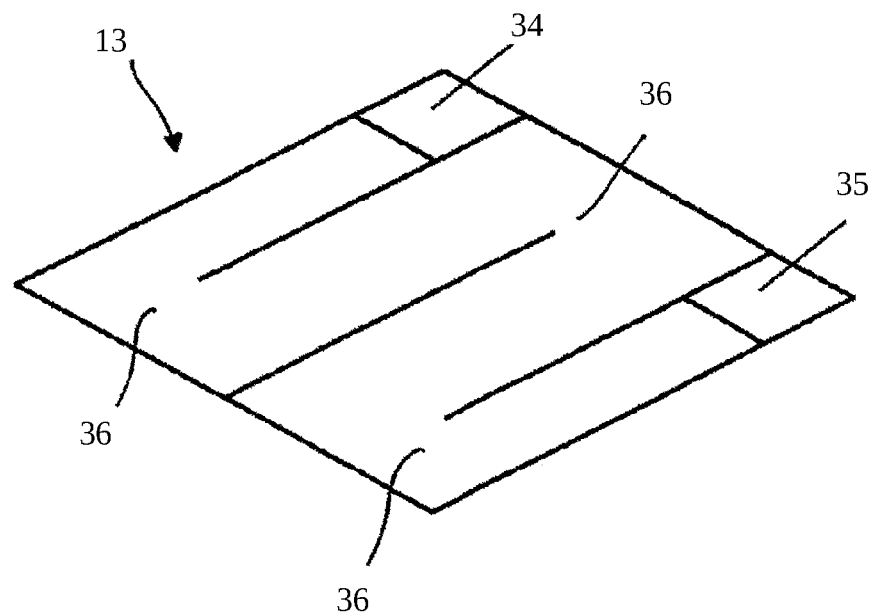
FIG. 3 shows a possible formation of a second electrode layer.

The second electrode layer 13 has an additional electrical contacting area 35, which is likewise free from sensor layers arranged over the electrode layer 13. This additional electrical contacting area 35 may be connected to an additional terminal pad. The additional electrical contacting area 35 is necessary to allow the second electrode layer 13 to be used as a heating coil or as a temperature-sensitive layer or as a shielding electrode. Depending on the contacting assignment (see FIG. 3) of the electrical contacting areas 34 and 35, the second electrode layer 13 may either heat and burn the particle 30 or detect the particle 30.

To be able to use an electrode layer, here the second electrode layer 13, as a heating coil and/or temperature-sensitive layer and/or shielding electrode, the second electrode layer 13 has a small number of strip conductor loops 36.

Figure 4:
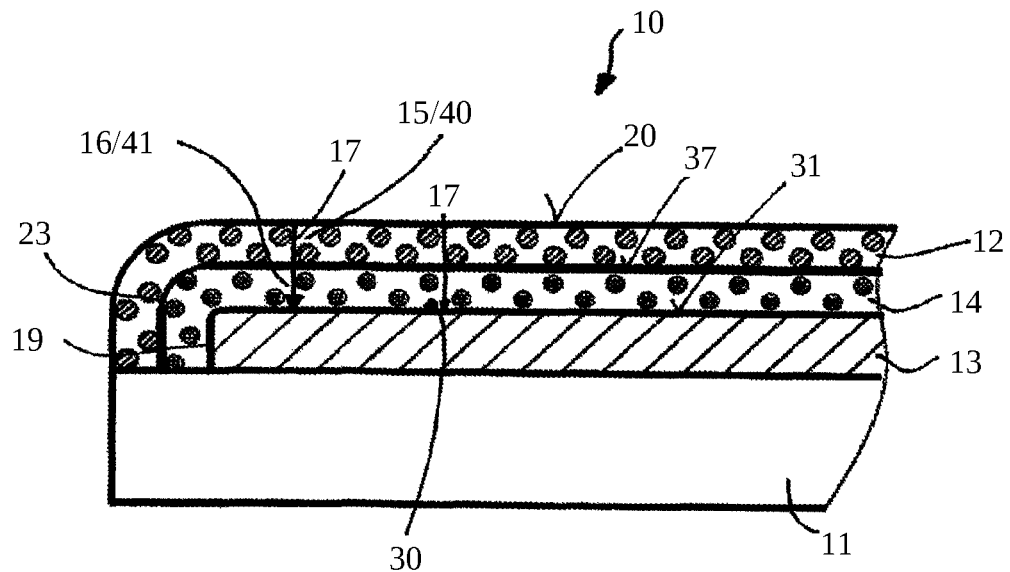
FIG. 4 shows a sectional representation of a further embodiment of a sensor for detecting electrically conductive and/or polarizable particles.

In FIG. 4, a further embodiment of a possible sensor 10 is shown. The first electrode layer 12 and the insulation layer 14 are respectively formed as porous, the at least one opening 15 in the first electrode layer 12 and the at least one opening 16 in the insulation layer 14 respectively being formed by at least one pore, the pore 41 in the insulation layer 14 and the pore 40 in the first electrode layer 12 being arranged at least in certain portions one over the other in such a way that the at least one passage 17 to the second electrode layer 13 is formed. In other words, it is possible to dispense with an active or subsequent structuring of the passages, the first electrode layer 12 and the insulation layer 14 being formed as permeable to the medium to be measured. The passages 17 are represented in FIG. 4 with the aid of the vertical arrows.

The passages 17 may be formed by a porous or granular structure of the two layers 12 and 14. Both the first electrode layer 12 and the insulation layer 14 can be produced by sintering together individual particles, with pores 40 and 41 or voids for the medium to be measured being formed while they are being sintered together. Accordingly, a passage 17 that allows access to the second electrode layer 13 for a particle 30 that is to be measured or detected must be formed, extending from the side 20 of the first electrode layer 12 that is facing away from the insulation layer 14 to the side 31 of the second electrode layer 13 that is facing the insulation layer 14 as a result of the one-over-the-other arrangement of pores 40 and 41 in the first electrode layer 12 and in the insulation layer 14.

In the example shown, the second electrode layer 13 is completely enclosed on the side face 19 by the porous insulation layer 14. The second electrode layer 13 is accordingly covered on the side 31 and on the side faces 19 by the porous insulation layer 14. The porous first electrode layer 12 on the other hand encloses the porous insulation layer 14 on the side face 23 and on the side 37 facing away from the second electrode layer 13. The insulation layer 14 is accordingly covered on the side 37 and on the side faces 23 by the first electrode layer 12.

If this sensor 10 has a covering layer, this covering layer is also to be formed as porous in such a way that a pore in the covering layer, a pore 40 in the first electrode layer 12 and a pore 41 in the insulation layer 14 form a passage 17 to the second electrode layer 13.

With regard to a possible production process in connection with the sensors 10 according to the invention of FIGS. 1a-c, 2 and 4, reference is made to the production possibilities already described, in particular etching processes.

At this stage it should be pointed out that all of the elements and components described above in connection with the embodiments according to FIGS. 1 to 4 are essential to the invention on their own or in any combination, in particular the details that are shown in the drawings.

LIST OF DESIGNATIONS

10 Sensor
11 Substrate
12 First electrode layer
13 Second electrode layer
14 Insulation layer
15 Opening in first electrode layer
16 Opening in insulation layer
17 Passage
18 Bonding agent layer
19 Side face of second electrode layer
20 Side of the first electrode layer
21 Covering layer
22 Side face of first electrode layer
23 Side face of insulation layer
34 Upper portion of covering layer
25 Side portion of covering layer
26 Side of covering layer
27 Porous filter layer
28 Bottom of blind hole
29 Opening in covering layer
30, 30' Particle
31 Side of second electrode layer
32 Peripheral region of first electrode layer
33 Electrical contacting area of first electrode layer
34 Electrical contacting area of second electrode layer
35 Additional electrical contacting area of second electrode layer
36 Strip conductor loop
37 Side of insulation layer
40 Pore in first electrode layer
41 Pore in insulation layer
d Thickness of insulation layer

What is claimed is:

1. A sensor for detecting soot particles in a combustion exhaust stream, the soot particles being electrically conductive or polarizable, the sensor comprising:
a substrate;
a first electrode layer and a second electrode layer, the second electrode layer arranged between the substrate and the first electrode layer;
an insulation layer disposed between the first electrode layer and the second electrode layer, and
a first opening disposed in the first electrode layer and a second opening disposed in the insulation layer,
wherein the first opening and the second opening are aligned to form a first passage to the second electrode layer, the first passage for receiving the soot particles;
wherein the soot particles are detected by electrical conductivity between the first electrode layer and the second electrode layer;
wherein the insulation layer laterally encloses the second electrode layer;
wherein the insulation layer comprises a heat resistance of at least 850° C. in the combustion exhaust stream.

2. The sensor as claimed in claim 1, wherein the first opening is distal from a peripheral region of the first electrode layer and the second opening is distal from a peripheral region of the insulation layer.

3. The sensor as claimed in claim 1, wherein the first electrode layer or the second electrode layer comprises a metal, a metal alloy, a high-temperature-resistant metal, a high-temperature-resistant alloy, a platinum metal, or an alloy of a metal of the platinum metals.

4. The sensor as claimed in claim 3,
wherein the first electrode layer comprises a first material selected from the group of a metal, a metal alloy, a high-temperature-resistant metal, a high-temperature-resistant alloy, a platinum metal, or an alloy of platinum metals,
wherein the second electrode comprises a second material selected from the group of a metal, a metal alloy, a high-temperature-resistant metal, a high-temperature-resistant alloy, a platinum metal, or an alloy of platinum metals, and
wherein the second material has a higher etching resistance than the first material.

5. The sensor as claimed in claim 1, further comprising a covering layer disposed on a side of the first electrode layer, the side of the first electrode layer facing away from the insulation layer, the covering layer comprising ceramic, a glass, a metal oxide, or a combination thereof.

6. The sensor as claimed in claim 5,
wherein the first passage is a blind hole,
wherein a portion of the second electrode layer is a bottom of the blind hole, and
wherein the blind hole extends through the insulation layer, the first electrode layer, or the covering layer.

7. The sensor as claimed in claim 6, wherein
the blind hole has a square cross section with a surface area in a range of $3\times3$ $\mu m^2$-$150\times150$ $\mu m_2$, a range of $10\times10$ $\mu m^2$-$100\times100$ $\mu m^2$, a range of $15\times15$ $\mu m^2$-$50\times50$ $\mu m^2$, or $20\times20$ $\mu m^2$.

8. The sensor as claimed in claim 1,
further comprising a third opening disposed in the first electrode layer and a fourth opening disposed in the insulation layer,
wherein the third opening and the fourth opening are aligned to form a second passage to the second electrode layer,
wherein the first passage is a first blind hole having a first cross-sectional area,
wherein the second passage is a second blind hole having a second cross-sectional area, and
wherein the first cross-sectional area is larger than the second cross-sectional area.

9. The sensor as claimed in claim 1,
wherein the first electrode layer comprises a first electrical contact area,
wherein the second electrode layer comprises a second electrical contact area,
wherein the first electrical contact area is connected to the first electrode layer, the second electrical contact area is connected to the second electrode layer,
wherein the second electrical contact area is not overlaid by the insulation layer and the first electrode layer,
wherein the first electrical contact area is not overlain by a covering layer, and
wherein each electrical contact area is connected to a terminal pad.

10. The sensor as claimed in claim 9,
wherein the first electrode layer or the second electrode layer comprises a strip conductor loop, strip conductor loop being a heating coil, a temperature-sensitive layer, a shielding electrode, or a combination thereof, wherein the first electrode layer or the second electrode layer comprising the strip conductor loop comprises further a third electrical contact area not overlaid by the insulation layer or an electrode layer, and wherein the third electrical contact area is connected to the terminal pad.

11. The sensor for detecting soot particles of claim 1, wherein the insulation layer consists of a thermally stable material with a high insulation resistance.

12. The sensor for detecting soot particles of claim 1, wherein the insulation layer is selected from the group consisting of aluminum oxide ($Al_2O_3$) or silicon dioxide ($SiO_2$) or magnesium oxide (MgO) or silicon nitride ($Si_3N_4$) or glass.

13. The sensor as claimed in claim 1,
wherein the first opening is a blind hole,
wherein a portion of the second electrode layer is a bottom of the blind hole, and
wherein the blind hole extends through the insulation layer or the first electrode layer.

14. The sensor as claimed in claim 13, wherein the blind hole has a square cross section with a surface area in a range of 3×3 µm²-150 ×150 µm², a range of 10×10 µm²-100×100 µm², a range of 15×15 µm²-50×50 µm², or 20×20 µm².

15. The sensor as claimed in claim 1, wherein the first opening is disposed in a top surface of the first electrode, the top surface being planar.

16. The sensor as claimed in claim 1, wherein a cross-sectional area of the first opening and a cross-sectional area of the second opening are identical.

17. A method of making a sensor for detecting soot particles in a combustion exhaust stream, the soot particles being electrically conductive or polarizable, the sensor comprising
a substrate;
a first electrode layer and a second electrode layer, the second electrode layer arranged between the substrate and the first electrode layer;
an insulation layer disposed between the first electrode layer and the second electrode layer, and
a first opening disposed in the first electrode layer and a second opening disposed in the insulation layer,
wherein the first opening and the second opening are aligned to form a first passage to the second electrode layer;
wherein the insulation layer laterally encloses the second electrode layer; the method comprising the steps of:
laminating the first electrode layer, the second electrode layer, and the insulation layer to form a laminate, the insulation layer being disposed between the first electrode layer and the second electrode layer,
subsequently forming a passage through the first electrode layer and the insulation layer, and
ending the passage to have a bottom formed by a portion of the second electrode layer, the passage for receiving the soot particles;
wherein the soot particles are detected by electrical conductivity between the first electrode layer and the second electrode layer;
wherein the insulation layer comprises a heat resistance of at least 850° C. in the combustion exhaust stream.

18. The method as claimed in claim 17, wherein the passage is formed as a blind hole by etching, plasma-ion etching, or successive etching adapted to each layer being etched.

19. The method as claimed in claim 17,
wherein the passage is formed as a blind hole by etching, plasma-ion etching, or successive etching adapted to each layer being etched, and
wherein the insulation layer is etching-resistant layer, the blind hole being formed in the insulation layer by a conditioning process with phase conversion of the insulation layer.

20. The method as claimed in claim 17,
wherein the passage is partially formed as a blind hole by laser machining, and
wherein laser machining is performed by a laser source, wavelength, a laser pulse frequency adapted individually to each layer being machined.

21. A method of making a sensor for detecting soot particles in a combustion exhaust stream, the soot particles being electrically conductive or polarizable, the sensor comprising
a substrate;
a first electrode layer and a second electrode layer, the second electrode layer arranged between the substrate and the first electrode layer;
an insulation layer disposed between the first electrode layer and the second electrode layer, and
a first opening disposed in the first electrode layer and a second opening disposed in the insulation layer,
wherein the first opening and the second opening are aligned to form a first passage to the second electrode layer, the first passage for receiving the soot particles;
wherein the soot particles are detected by electrical conductivity between the first electrode layer and the second electrode layer;
wherein the insulation layer laterally encloses the second electrode layer;
the method comprising the steps of:
laminating the first electrode layer, the second electrode layer, and the insulation layer to form a laminate, the insulation layer being disposed between the first electrode layer and the second electrode layer,
wherein the insulation layer and the first electrode layer are structured by a lift-off process, an ink-jet process, a stamping process one over the other forming a passage to the second electrode layer;
wherein the insulation layer comprises a heat resistance of at least 850° C. in the combustion exhaust stream.

22. A sensor for detecting soot particles in a combustion exhaust stream, the soot particles being electrically conductive or polarizable, the sensor comprising:
a substrate;
a first electrode layer and a second electrode layer, the second electrode layer arranged between the substrate and the first electrode layer;
an insulation layer disposed between the first electrode layer on a side opposite to the insulation layer; and
a first opening disposed in the first electrode layer and a second opening disposed in the insulation layer;
wherein the first opening and the second opening are aligned to form a first passage to the second electrode layer, the first passage for receiving the soot particles from the combustion exhaust stream;
wherein the soot particles are detected by electrical conductivity between the first electrode layer and the second electrode layer;
wherein the insulation layer laterally encloses a side portion of the second electrode layer; and
wherein the insulation layer comprises a heat resistance of at least 850° C. in the combustion exhaust stream.

23. The sensor as claimed in claim 22,
further comprising a covering layer disposed on a side of the first electrode layer opposite to the insulation layer; wherein the covering layer comprises a heat resistance of at least 850° C. in an exhaust stream.

\* \* \* \* \*